(12) United States Patent
Strmcnik et al.

(10) Patent No.: US 10,427,169 B1
(45) Date of Patent: Oct. 1, 2019

(54) ELECTROCHEMICAL FILTER FOR REMOVAL OF TRACE LEVEL IONS

(71) Applicant: Energy, United States Department of, Washington, DC (US)

(72) Inventors: Dusan Strmcnik, Lemont, IL (US); Vojislav Stamenkovic, Naperville, IL (US); Nenad Markovic, Hinsdale, IL (US)

(73) Assignee: U.S. Department of Energy, Washington, DC (US)

( * ) Notice: Subject to any disclaimer, the term of this patent is extended or adjusted under 35 U.S.C. 154(b) by 232 days.

(21) Appl. No.: 15/371,368

(22) Filed: Dec. 7, 2016

(51) Int. Cl.
*B03C 5/02* (2006.01)
(52) U.S. Cl.
CPC ..................................... *B03C 5/02* (2013.01)
(58) Field of Classification Search
CPC .................................................. C02F 1/4691
See application file for complete search history.

(56) References Cited

U.S. PATENT DOCUMENTS

| | | | | |
|---|---|---|---|---|
| 3,515,664 A | * | 6/1970 | Johnson | B01D 57/02 204/627 |
| 3,687,829 A | * | 8/1972 | Factor | B01J 47/08 204/550 |
| 2018/0141834 A1 | * | 5/2018 | Wessling | C02F 1/4691 |

FOREIGN PATENT DOCUMENTS

SU   424810   * 9/1974

* cited by examiner

*Primary Examiner* — Salil Jain
(74) *Attorney, Agent, or Firm* — Karen L. Blouin; Michael J. Dobbs; Brian J. Lally

(57) ABSTRACT

An electrochemical filter system is provided that can produce an ultra-clean electrolyte solution. The filter uses a working electrode with binding sites that adsorb impurities present in the electrolyte solution using a pseudocapacitive process.

4 Claims, 3 Drawing Sheets

ELECTROCHEMICAL FILTER FOR REMOVAL OF TRACE LEVEL IONS

GOVERNMENT INTERESTS

The United States Government has rights in this invention pursuant to Contract No. DE-AC02-06CH11357 between the U.S. Department of Energy (DOE) and UChicago Argonne, LLC.

FIELD OF THE INVENTION

The present invention relates to an electrochemical filter that removes strongly adsorbing anions, metals or transition metals from a neutral, acidic or alkaline deaerated electrolyte solution, based on a pseudocapacitive process.

BACKGROUND OF THE INVENTION

Electrochemical filters based on porous conductive materials are devices which can be used to purify water, industrial waste waters, effluents and other electrolytes by removing undesired materials such as heavy metals, salts, organic molecules, even bacteria and other biological contaminants. Prior art electrochemical filters have two main principles of operation: 1) deposition with charge transfer or electrodeposition (Faradaic process); and 2) adsorption without charge transfer called electrosorption (based on electrostatic interaction similar to a capacitor).

Specialized applications rely on the availability of ultra-clean electrolytes for use in experiments, testing and other applications such as surface electrochemistry. Therefore a need exists for the production of ultra-clean electrolyte solutions in an inexpensive, efficient and repeatable manner.

SUMMARY OF THE INVENTION

According to one aspect of the invention, a filter system is provided which may be used to produce ultra-clean electrolyte solutions. A filter system has a filter housing with at least one peripheral sidewall. The sidewall defines an interior chamber which has an intake opening and an output opening. The interior chamber has an upper chamber segment adjacent the intake opening. A reference electrode and a counter electrode are disposed within the interior chamber. Working electrode is disposed within the interior chamber. A wire is in electrical communication with the working electrode. The wire, reference electrode and counter electrode are connected to a voltage controller. The working electrode has many binding sites that are integrally formed with the surface area of the working electrode. The electrical potential of the working electrode is maintained at a target potential range by the voltage controller such that when a deaerated electrolyte solution is introduced into the intake opening, at least one of the binding sites adsorbs at least one of the plurality of impurities using a pseudocapacitive process, i.e. adsorption with charge transfer.

In another aspect of the invention, a method for producing an ultra-clean electrolyte includes placing a working electrode, a reference electrode and a counter electrode within an interior chamber of a filter housing. The filter housing has an intake opening and an output opening. The working electrode has several binding sites integrally formed with the surface area of the working electrode. The method further includes introducing a deaerated electrolyte solution into the intake opening. The method further includes maintaining the electrical potential of the working electrode at a target potential range with a voltage controller such that at least one of the plurality of binding sites adsorbs at least one of the impurities using a pseudocapacitive process, i.e. adsorption with charge transfer. The method includes the step of collecting an ultra-clean electrolyte at the output opening. In some embodiments the electrolyte may be re-introduced to the intake opening a desired number of times.

In yet another aspect of the invention, a filter apparatus is provided. A filter system has a filter housing with at least one peripheral sidewall. The sidewall defines an interior chamber which has an intake opening and an output opening. The interior chamber has an upper chamber segment adjacent the intake opening. A reference electrode and a counter electrode are disposed within the interior chamber. Working electrode is disposed within the interior chamber. A wire is in electrical communication with the working electrode. The wire, reference electrode and counter electrode are connected to a voltage controller. The working electrode has many binding sites that are integrally formed with the surface area of the working electrode. The electrical potential of the working electrode is maintained at a target potential range by the voltage controller such that when a solution is introduced into the intake opening, at least one of the binding sites adsorbs at least a percentage of the solution using a pseudocapacitive process, i.e. adsorption with charge transfer.

BRIEF DESCRIPTION OF THE DRAWINGS

These and further aspects of the invention and their advantages can be discerned in the following detailed description in which like characters denote like parts and in which.

DETAILED DESCRIPTION OF THE INVENTION

An electrochemical filter system 100 according to the invention can be used to obtain an ultra-clean electrolyte solution 104. An electrolyte is a liquid or gel that contains ions. An ultra-clean electrolyte 104 is an electrolyte solution that does not contain undesirable impurities. The level to which the impurities are considered undesirable is application specific. Using ultra-clean electrolytes 104 in various applications and experiments yields more accurate and repeatable results.

Figure 1:
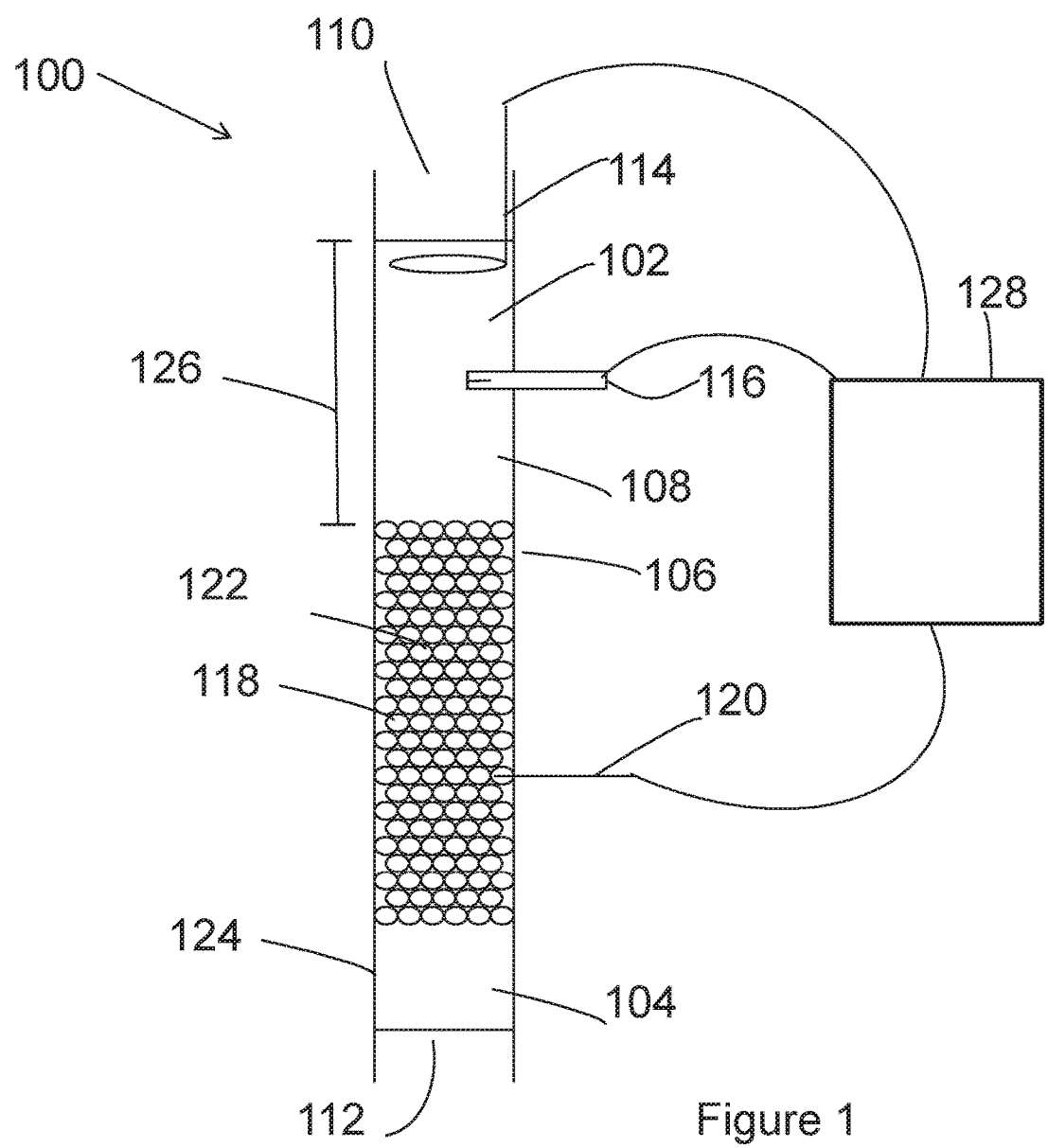
FIG. 1 is a front view of one embodiment of the electrochemical filter according to the invention.

The electrochemical filter system 100 illustrated in FIG. 1 includes a deaerated electrolyte solution 102. In a deaerated solution the air has been removed from the solution. A deaerated solution is obtained by purging of the oxygen-containing solution with an inert gas (nitrogen or argon) until 99% of oxygen has been removed. Other methods of deaerating the solution may be used. The solution 102 may be an alkaline, acidic or neutral solution. The solution 102 contains impurities; the specific impurities present in the solution 102 are dependent on the precise electrolyte solution 102 of the electrochemical filter system 100. In one embodiment the solution 102 is perchloric acid. In the embodiment in which the solution 102 is perchloric acid, the impurities would be nitrates. Alternate embodiments include solutions 102 other than perchloric acid with impurities that may include sulfate, chloride, bromide, iodide, phosphate and nitrate; heavy metals such as copper, lead, and silver; and transition metals such as nickel, cobalt, iron and manganese.

The electrochemical filter system 100 illustrated in FIG. 1 includes a filter housing 106. The filter housing 106 may be formed of any material that can contain an alkaline, neutral or acidic electrolyte solution 102 including but not limited to perchloric acid. In one embodiment the filter housing 106 is formed of quartz. Alternate embodiments may have a filter housing 106 formed of a Teflon-based material.

The filter housing 106 has at least one peripheral sidewall 124. The filter housing 106 may be any shape that properly contains the electrochemical filter system 100. In the embodiment illustrated in FIG. 1 the filter housing 106 is cylindrical, having a diameter of approximately 1 inch and a length of approximately 10 inches. The diameter and length of the housing 106 are application dependent.

As outlined above, the electrochemical filter system 100 can be used to remove strongly adsorbing anions from a solution 102 including but not limited to sulfate, chloride, bromide, iodide, nitrate and phosphate. The anions can be removed to an approximate molar concentration of $10^{-8}$ mol/L. In alternate embodiments the electrochemical filter system 100 may be used to remove heavy metals, including but not limited to copper, lead, and silver, from neutral, acidic or alkaline solutions 102. The heavy metals can be removed to an approximate molar concentration of $10^{-9}$ mol/L. In yet a further alternate embodiment the electrochemical filter system 100 may be used to remove transition metals, including but not limited to nickel, cobalt, iron and manganese, from a solution 102. The transition metals can be removed to an approximate molar concentration of $10^{-9}$ mol/L.

The peripheral sidewall of the filter housing 124 defines an interior chamber 108. The interior chamber has two openings, an intake opening 110 and an output opening 112. The solution 102 is introduced into the interior chamber 108 via the intake opening 110. The solution 102 may be titrated or poured at a rate and volume determined by a user. The ultra-clean solution 104 exits the filter via the output opening 112. The interior chamber 108 has upper chamber segment 126. The upper chamber segment 126 is disposed adjacent the intake opening 110. A reference electrode 116 is disposed in the upper chamber segment 126. A counter electrode 114 is also disposed in the upper chamber segment 126. The reference and counter electrodes 116, 114 are disposed in the upper chamber segment 126 to avoid contamination of the filtered solution 104.

A filtering material or working electrode 118 is disposed in the interior chamber 108 adjacent the upper chamber segment 126 and the output opening 112. A wire 120 disposed within the interior chamber 108 is in electrical communication with the working electrode 118. The wire 120 may be inserted into the interior chamber 108 via the intake opening 110, output opening 112 or may be threaded through the sidewall 124. The wire 120 may be positioned in any manner which allows it to be in electrical communication with the working electrode 118.

The wire 120, reference electrode 116 and counter electrode 114 are connected to a voltage controller 128. The voltage controller 128 may be a potentiostat. A potentiostat is an electronic instrument that controls the voltage difference between a working electrode and a reference electrode by injecting current through a counter electrode. The voltage controller 128 maintains the potential of the working electrode 118 in a range in which the impurity would be adsorbed. The range has a maximum value of potential and a minimum value of potential and the voltage controller may cycle between the maximum and minimum values as determined by the user. In alternate embodiments the range may be a constant value with the maximum value being approximately equal to the minimum value.

A surface area of the working electrode 118 has a multitude of binding sides integrally formed on the surface area. A binding site is a region on the surface area of the working electrode 118 with which a specific molecule, ion or anion may form a chemical bond. In operation as the solution 102 is introduced to the filter system 100, impurities are adsorbed to the surface of the working electrode 118 via a pseudocapacitive process as the individual molecules, ions or anions bond to the binding site on the working electrode 118, following charge transfer.

A pseudocapacitive process is a self-limiting electrochemical process where a charged species $X^-$ or $X^+$ forms a covalent bond with a surface atom Y to form an adsorbed species X.

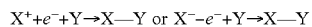

$$X^+ + e^- + Y \rightarrow X\!\!-\!\!Y \text{ or } X^- - e^- + Y \rightarrow X\!\!-\!\!Y$$

After all the surface sites Y are consumed, the process stops, hence it is self-limiting. Therefore, a pseudocapcitive process is dependent on the number of available surface sites of the adsorbing material and is therefore inherently different from a Faradaic process (continuous charge transfer) or a pure capacitive process (electrostatic interaction with no charge transfer).

In the embodiment illustrated in FIG. 1 in which the solution is perchloric acid, a silver/silver chloride (Ag/AgCl) electrode is used as the reference electrode 116. Alternate embodiments may have a reference electrode 116 formed of a different material. The counter electrode 114 is formed of platinum. Alternate embodiments may have a counter electrode 114 formed of a different material. The choice of the reference electrode 116 and counter electrode 114 correspond to the solution and the impurities being targeted. The reference and counter electrodes 116, 114 are spaced from the working electrode 118. In the illustrated embodiment the counter electrode 114, working electrode 118 and wire 120 are all formed of platinum. Alternate embodiments may have a counter electrode 114, working electrode 118 and wire 120 formed of a different material. Further alternate embodiments may have a counter electrode 114, working electrode 118 and wire 120 where the electrodes 114, 118 and wire 120 are not all formed of the same material.

In the illustrated embodiment the working electrode 118 consists of platinum coated quartz granules 122 which are in electrical communication with each other. The granules in this embodiment have an approximately 100 nm thick highly porous film of platinum on a chemically inert support resulting in platinum clusters approximately 5-10 nm in diameter. Alternate embodiments may have working electrodes 118 that consist of clusters of different sizes than approximately 5-10 nm in diameter. Further alternate embodiments may have working electrodes 118 that are in a different form than coated granules such as powders.

Platinum has the property of being able to underpotentially bind anions and metals while exhibiting high electric conductivity and chemical stability. Other platinum group metals and metals such as gold may be used for a working electrode 118 if acceptable results are obtained. The material for the working electrode 118 can be chosen responsive to the electrolyte solution and the impurities that are being filtered.

In the illustrated embodiment, a voltage controller 128 controls the voltage difference between the working electrode 118 and the reference electrode 116. The voltage controller 128 may be a potentiostat. The wire 120 is in electrical communication between the voltage controller 128 and the working electrode 118. In the illustrated embodiment a platinum wire 120 is used. In alternate embodiments a wire of a different material may be used and the wire may or may not be formed of the same material as the working electrode.

In the embodiment illustrated in FIG. 1, the target potential range is 0.3V and is held by a potentiostat 128. The voltage potential of 0.3 V causes the nitrates in the perchloric acid 102 to be adsorbed to the working electrode 118 when the solution 102 is run through the filter system 100. The adsorption is a psuedocapacitive process because the adsorption occurs with charge transfer between the solution 102 and the working electrode 118, but is limited to the number of adsorption sites on the working electrode. Alternate embodiments may have the voltage held by other devices such that the voltage of the working electrode 118 is below the reversible potential of the reduction-oxidation reaction. Further embodiments may have a target potential range with a minimum value and a maximum value. The voltage controller 128 may cycle between the minimum value and maximum value at a predetermined cyclical rate.

In operation the impurities are adsorbed by the working electrode 118. The rate of adsorption is determined by the diffusion rate of impurities to the surface. In other words the capacity of the filter system 100 depends on the porosity of the filtering material 118 and the amount of filtering material 118.

In embodiments in which the level of impurities remains too high after the solution 102 is run through the filter system 100 a first time, the resulting ultra-clean solution can be run through the filter a second time. The filter system 100 may be easily reused. To clean the working electrode 118, the working electrode 118 may be rinsed with ultraclean water. Alternatively, the working electrode 118 may be cleaned by managing the potential at a value at which the adsorption of the contaminants occurs while passing the same contaminated solution through the filter. For example for nitrates or most anions the potential would be held at −0.2 V vs Ag/AgCl.

Figure 2:
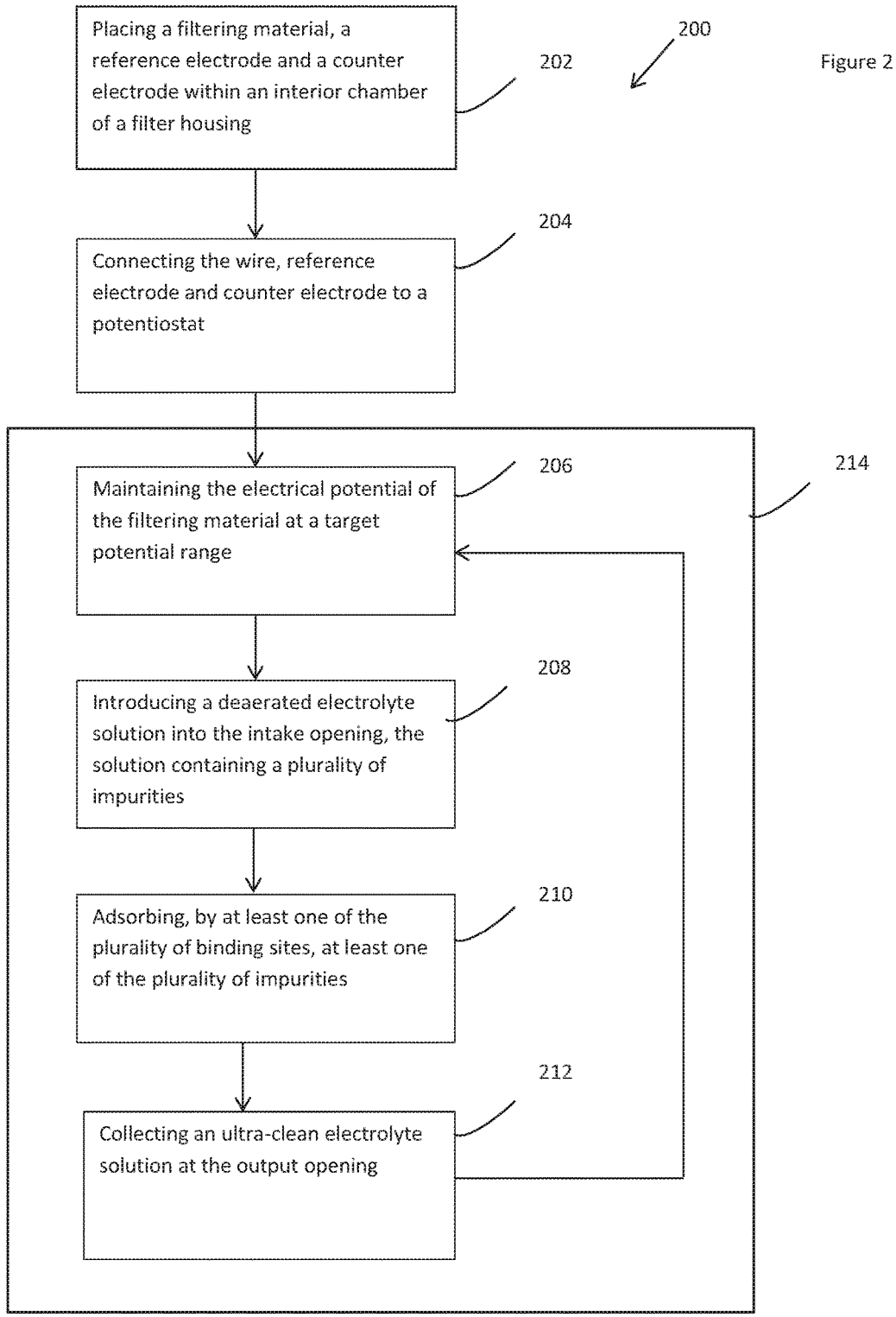
FIG. 2 is a schematic flow diagram illustrating steps in a process for producing an ultra-clean electrolyte solution according to the invention; and, FIG. 3 is a graphic comparison of two voltammograms.

FIG. 2 is a schematic block diagram illustrating steps for producing an ultra-clean electrolyte solution 200. In step 202 a filtering material 118, a reference electrode 116 and a counter electrode 114 are placed within an interior chamber 108 of a filter housing 106. The filter housing 106 has an intake opening 110 and an output opening 112. The surface of the filtering material 118 has a plurality of binding sites integrally formed with the surface area. A wire 120 is in communication with the filtering material 118. In step 204 the wire 120, reference electrode 116 and counter electrode 114 are connected to a voltage controller 128. The electrical potential of the filtering material 118 is maintained at a target potential range in step 206. Step 208 introduces a deaerated electrolyte solution 102 into the intake opening 110. The solution 102 contains many impurities. In step 210 at least one of the many impurities are adsorbed by at least one of the many biding sites. The ultra-clean electrolyte solution 104 is collected at the output opening 112 in step 212. In step 214, steps 206 through step 212 may be repeated a desired number of times.

Figure 3:
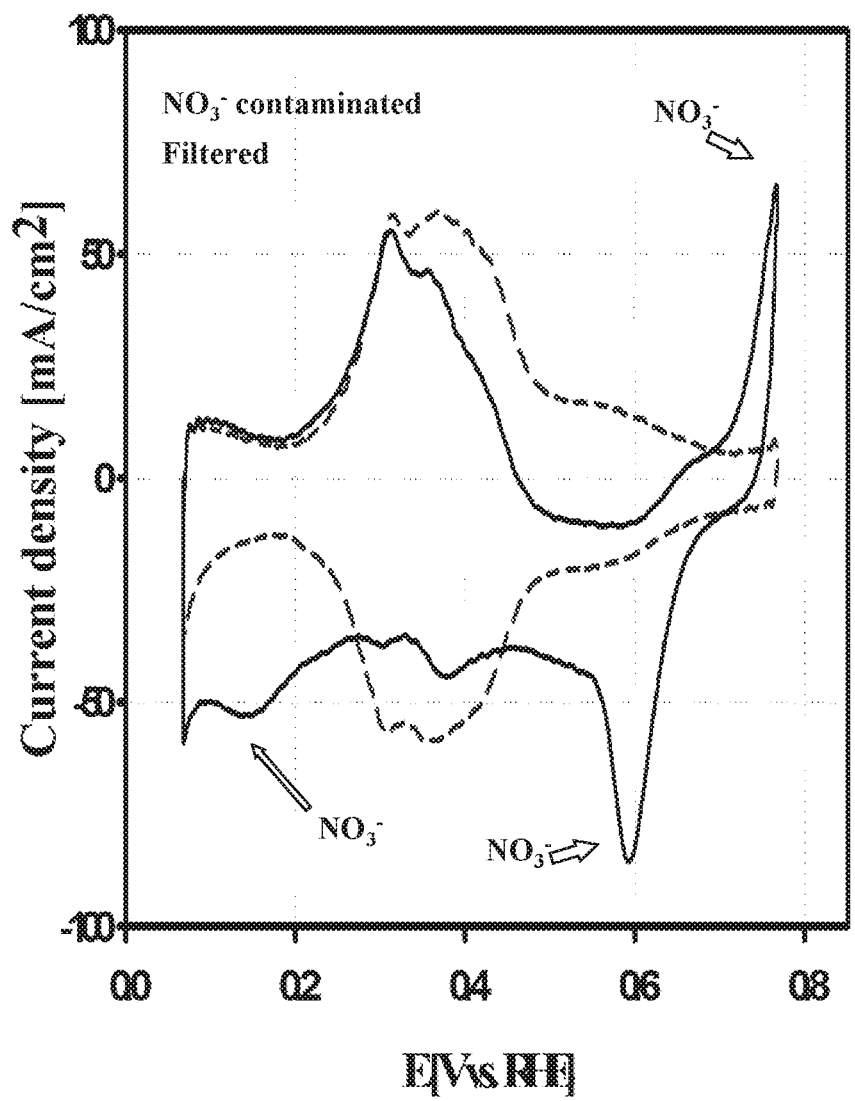

The solid line in FIG. 3 illustrates voltammetric response of Pt(100) in perchloric acid containing $10^{-5}$ mol/L $NO_3^-$ for the embodiment of the filter illustrated in FIG. 1. The dashed line represents the response in filtered acid. The concentration of the $NO_3^-$ was below the detection limit. No measureable amount of nitrate was found in the cleaned acid.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, 6. In particular, the use of "step of" in the claims herein is not intended to invoke the provisions of 35 U.S.C. § 112, 6.

The invention claimed is:

1. A method for removing impurities from perchloric acid using a pseudocapacitive process comprising the steps of:
   (a) placing a working electrode, a reference electrode, and a counter electrode within an interior chamber of a filter housing, the filter housing having an intake opening and an output opening, a surface area of the working electrode having a plurality of binding sites integrally formed with the surface area, a platinum wire in electrical communication with the working electrode, wherein the reference electrode is a silver/silver chloride electrode, the counter electrode is formed of platinum, and the working electrode is formed of quartz granules coated with platinum;
   (b) connecting the wire, reference electrode and counter electrode to a voltage controller;
   (c) maintaining the electrical potential of the working electrode at a target potential range;
   (d) introducing a deaerated perchloric acid into the intake opening, the perchloric acid containing a plurality of impurities, a portion of the plurality of impurities being a plurality of nitrate ions;
   (e) adsorbing, by at least one of the plurality of binding sites, at least one of the plurality of impurities nitrate ions;
   (f) collecting a filtered perchloric acid at the output opening; and,
   (g) testing the filtered perchloric acid.

2. The method of claim 1, and further comprising the step of
   (h) repeating steps (c)-(g) until the molar concentration of the plurality of nitrate ions in the perchloric acid is a desired value.

3. The method of claim 1, wherein the voltage controller is a potentiostat.

4. The method of claim 2, wherein the molar concentration of the plurality of nitrate anions in the filtered perchloric acid is approximately $10^{-8}$ mol/L.

* * * * *